United States Patent
Chang

(10) Patent No.: US 8,046,850 B2
(45) Date of Patent: Nov. 1, 2011

(54) FAUCET SPOUT STRUCTURE

(76) Inventor: Kim Chang, Taichung (TW)

(*) Notice: Subject to any disclaimer, the term of this patent is extended or adjusted under 35 U.S.C. 154(b) by 288 days.

(21) Appl. No.: 11/806,254

(22) Filed: May 30, 2007

(65) Prior Publication Data

US 2010/0212086 A1 Aug. 26, 2010

(51) Int. Cl.
  *E03C 1/04* (2006.01)
(52) U.S. Cl. .......................................................... 4/675
(58) Field of Classification Search ............... 4/675–678; 137/315, 359, 15.01, 801; 251/218; 29/157
  See application file for complete search history.

(56) References Cited

U.S. PATENT DOCUMENTS
7,766,043 B2 * 8/2010 Thomas et al. ............... 137/801
* cited by examiner

*Primary Examiner* — Lori Baker
(74) *Attorney, Agent, or Firm* — Tan-Chi Yuan

(57) ABSTRACT

A faucet spout structure comprises a spout housed between upper and lower housings of a water supply seat and assembled onto an outlet mount equipped with handles and a deck. The spout has a first connecting tube with an abutment surface and a stepwise coupling section extending at one end, to which a sealing ring and a coupling cavity of a second connecting tube are sequentially joined and firmly located by a buckling collar. The second connecting tube has the other end equipped with an external-threaded locking section and a stepwise conjoining section to fix to an assembling section of an outlet duct mounted to the outlet mount. The first connecting tube also has a fixing section defined by a water outlet to which a nozzle is secured and fixed to the conjoining end area of the upper and lower housings, achieving flexible assembly and maintenance of the spout thereby.

7 Claims, 11 Drawing Sheets

FAUCET SPOUT STRUCTURE

BACKGROUND OF THE INVENTION

The present invention relates to a faucet spout structure wherein the spout made up of first and second connecting tubes is molded in a movable-type assembly to be housed between a set of upper and lower housings of a water supply seat without being restricted by the form of the mutually engaged upper and lower housings so as to avoid the disadvantage of conventional spouts integrally molded and fixed between upper and lower housings; whereby the present invention can facilitate easy and speedy assembly and maintenance, reducing the cost of production to boost economical efficiency thereby.

Please refer to FIG. 1 showing an exploded perspective view of a conventional faucet spout structure (accompanied by FIG. 2). A conventional faucet spout includes a faucet 10 having a water supply mount 12 with handles 11 fixed thereto, and a set of upper and lower housings 13, 14 to house an integrally-molded water-discharge tube 15 therein. The water-discharge tube 15 is bent into an arcuate hooked shape to match to the curvature of the reciprocally combined upper and lower housings 13, 14 thereby. The water-discharge tube 15 also has one end equipped with a locking section 151 to secure to an assembling section 161 of a coupling tube 16 mounted to a central through hole 121 of the water supply mount 12, and match to a lift rod 17 extending through a clearance recess 121 disposed at one side of the central through hole 121. The water-discharge tube 15 has the other end equipped with a fixing section 152 to which a nozzle 18 is secured and locked onto the conjoining end edge of the upper and lower housings 13, 14 to complete the assembly of the faucet 10 thereof.

There are some drawbacks to such conventional faucet spout structure. First, the water-discharge tube 15 must be integrally molded in individual cast to fit to the form of the upper and lower housings 13, 14, which increases not only the cost of material but also the difficulty in assembly and maintenance thereof. Second, the water-discharge tube 15 molded via cast tends to have rough internal surfaces, which can easily get limescale accumulated thereon and result in the blockage of the tubing passage thereof. In addition, the water-discharge tube 15, molded in a fixed type, must be replaced as a whole set. Thus, the defective rate thereof is greatly increased and the cost and time spent on the maintenance thereof are also augmented as a result.

SUMMARY OF THE PRESENT INVENTION

It is, therefore, the primary purpose of the present invention to provide a faucet spout structure, comprising a spout molded in a movable-type assembly wherein a first connecting tube with a coupling section extending at one end is conjoined to a coupling cavity of a second connecting tube and fastened up thereto via a buckling collar, and the spout formed thereby is flexibly housed between a set of upper and lower housings of a water supply seat without being restricted by the form of the mutually engaged upper and lower housings so as to avoid the extra manufacturing process as found in the aforementioned fixed-type faucet spout, efficiently reducing the cost of production thereby.

It is, therefore, the second purpose of the present invention to provide a faucet spout structure wherein the spout is made up of the first and second connecting tubes that can be bent into different curvatures so that, when the coupling section of the first connecting tube is conjoined to the coupling cavity of the second connecting tube, the first and second connecting tubes are combined to form spouts of different curvatures to match to various-style water supply seats each composed of the upper and lower housings fixedly combined together; whereby, the spout can be flexibly matched to a wide range of water supply seats as well as achieve easy and convenient assembly and maintenance, making it more durable and reducing the replacement and defective rates thereby.

DETAILED DESCRIPTION OF THE PREFERRED EMBODIMENTS

Figure 1:
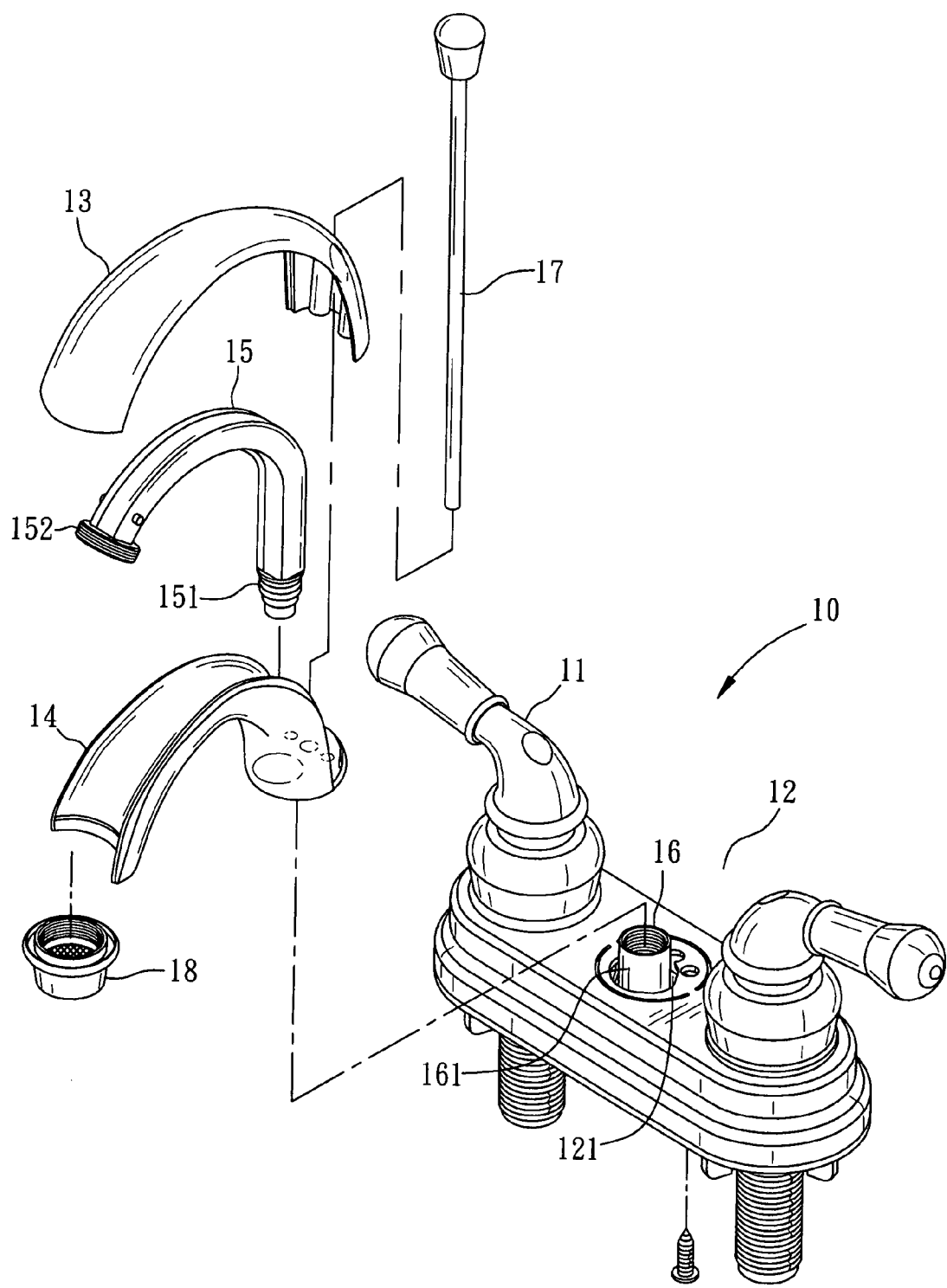
FIG. 1 is an exploded perspective view of a conventional faucet spout structure.
Figure 2:
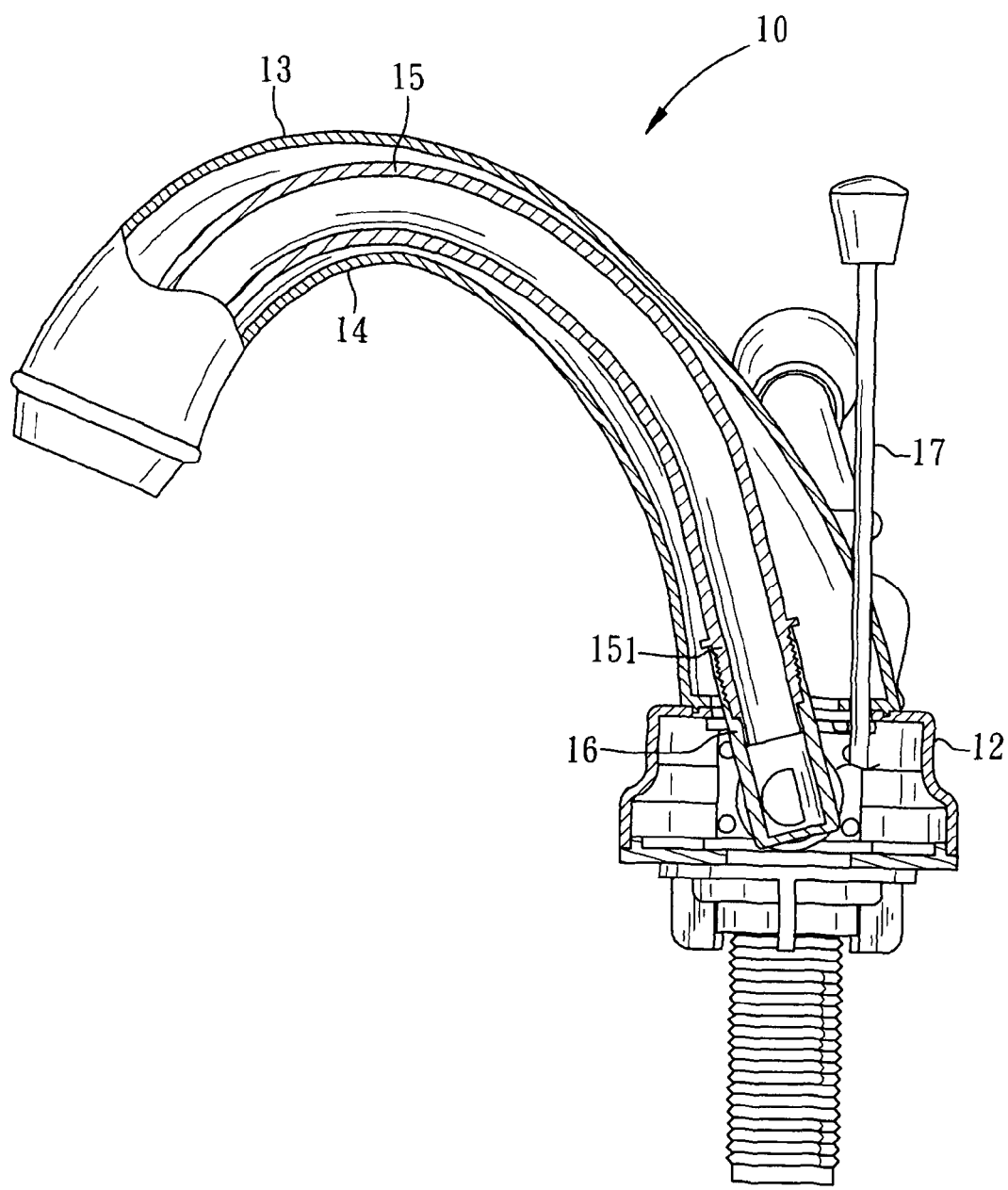
FIG. 2 is an assembled cross sectional view of the conventional faucet spout structure.
Figure 3:
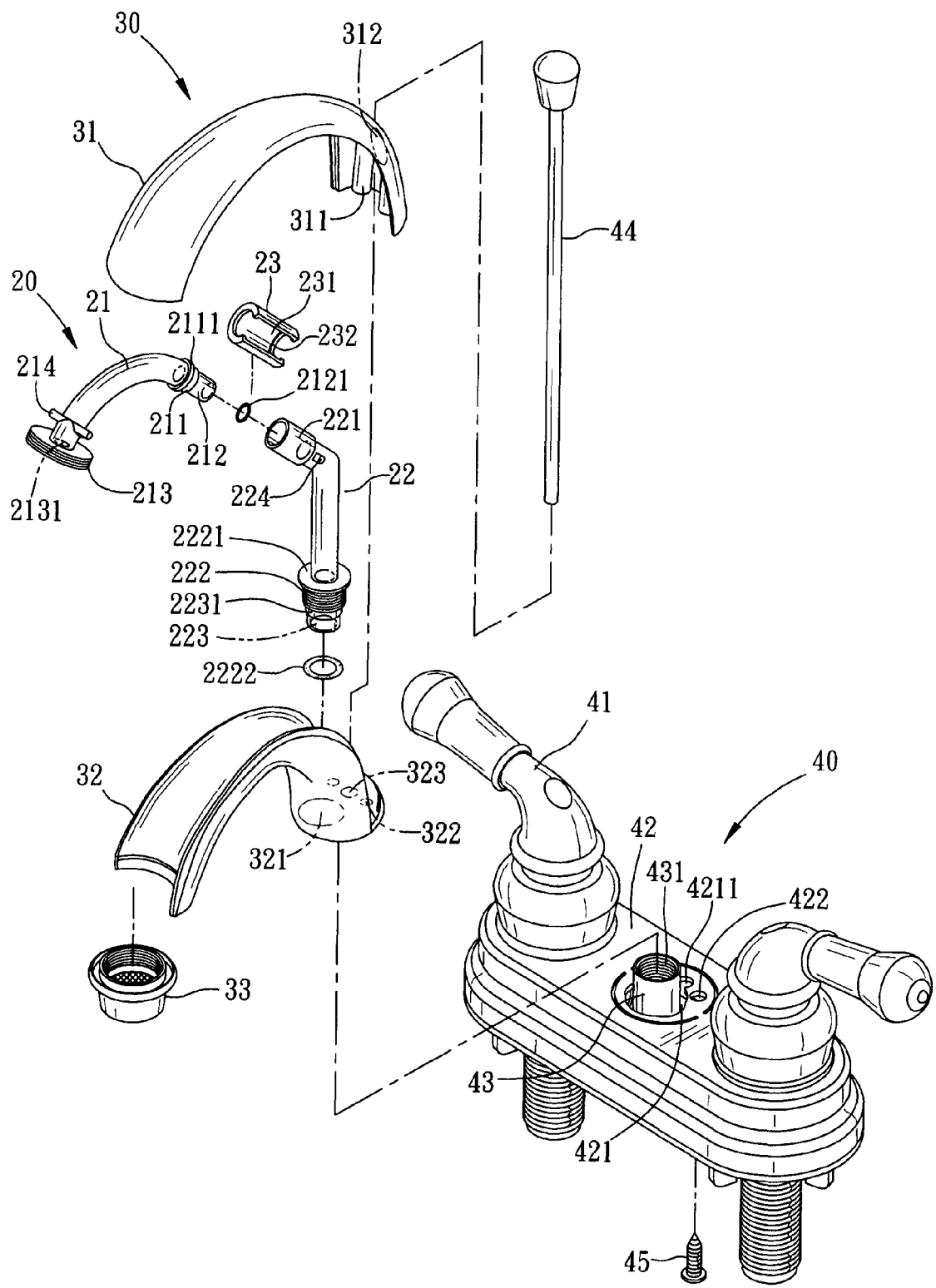
FIG. 3 is an exploded perspective view of the present invention.
Figure 4:
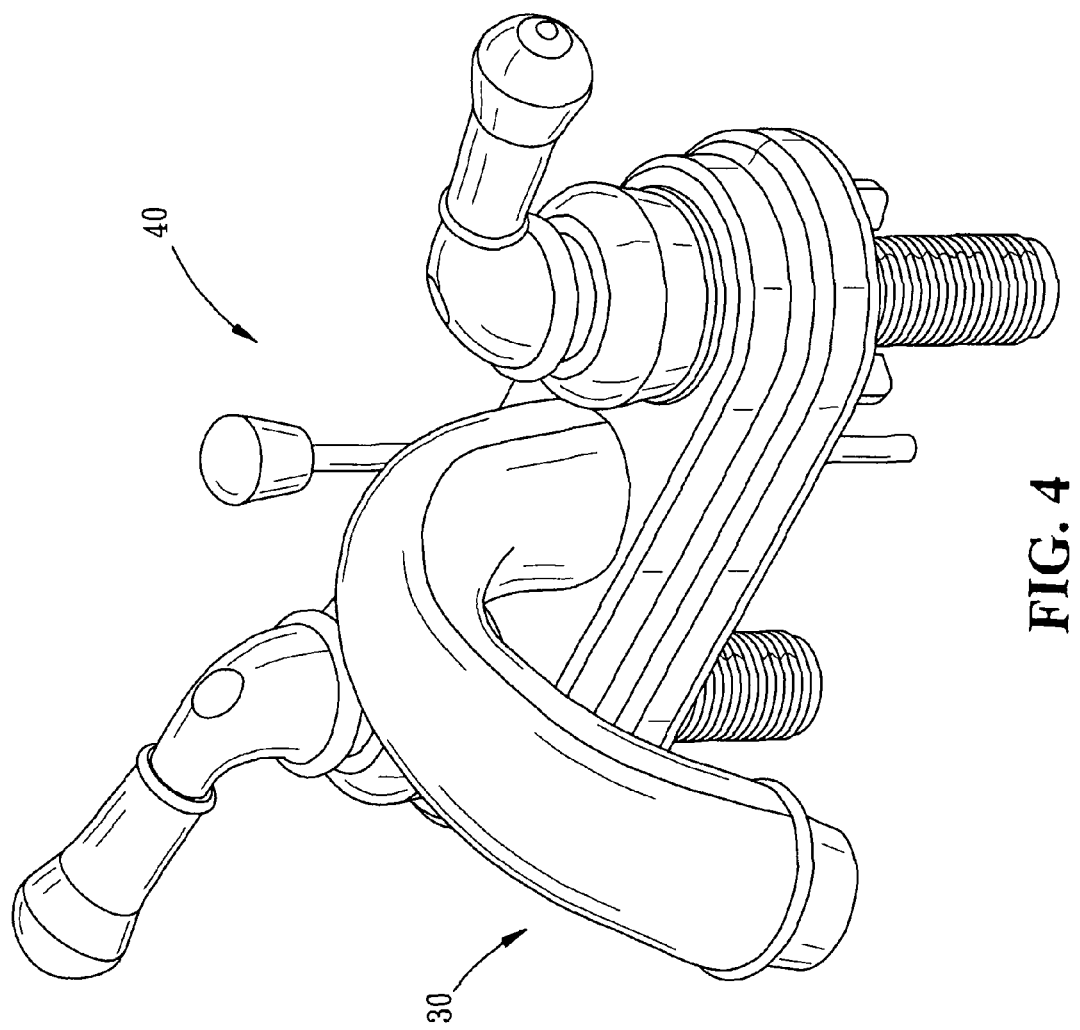
FIG. 4 is an assembled perspective view of the present invention.
Figure 5:
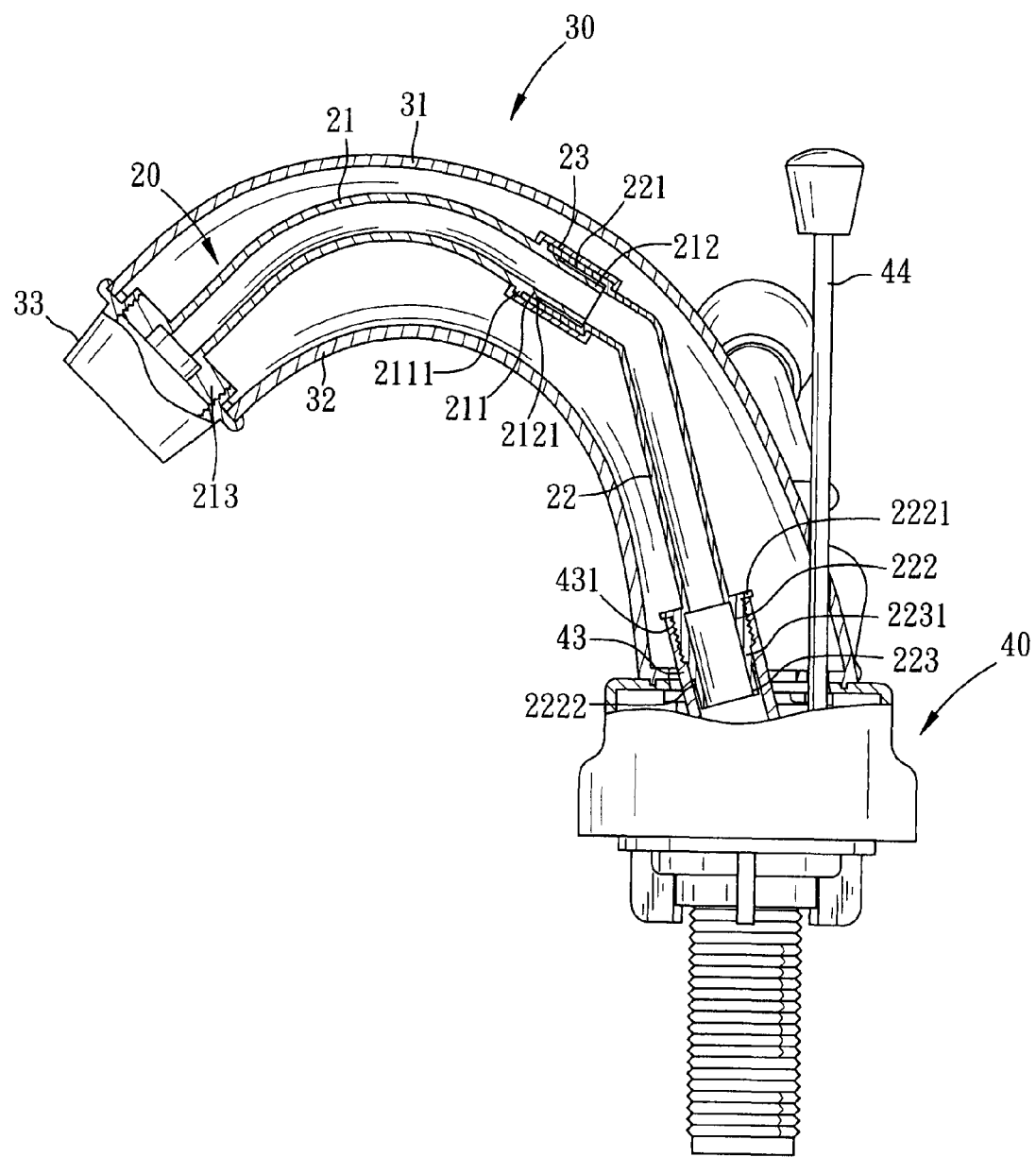
FIG. 5 is an assembled cross sectional view of the present invention.

Please refer to FIG. 3 showing an exploded perspective view of the present invention (accompanied by FIGS. 4 to 5 inclusive). The present invention relates to a faucet spout structure, comprising a spout 20 housed inside a set of upper and lower housings 31, 32 of a water supply seat 30 and assembled onto an outlet mount 40 equipped with handles 41 and a deck 42 to form a faucet structure thereby. The spout 20 is made of high/low-temperature resistant plastic material and composed of an arcuate curved first connecting tube 21 and a hooked second connecting tube 22. The first connecting tube 21 has one end equipped with an abutment surface 211 with a support flange 2111 protruding thereon, and a stepwise coupling section 212 extending thereon, to which a sealing ring 2121 and a coupling cavity 221 disposed at one end of the second connecting tube 22 are sequentially joined and abutted tight thereto. A C-shaped buckling collar 23 defined by a flexible opening 231 is equipped with a set of restricting walls 232 extending at both ends thereon to securely clamp onto the conjoining area of the coupling section 212 and the coupling cavity 221 of the first and second connecting tubes 21, 22 and buckle up tight thereto. The second connecting tube 22 has the other end equipped with an external-threaded locking section 222 with a reinforcing side 2221 protruding thereon and a stepwise conjoining section 223 with a stop surface 2231 extending thereon to which a water-sealing ring 2222 is mounted and abutted tight thereto. The first connecting tube 21 has the other end equipped with a fixing section 213 defined by a water outlet 2131 to which a nozzle 33 is secured and fixed to the conjoining end area of the upper and lower housings 31, 32 thereon. Besides, the first and second connecting tubes 21, 22 are respectively equipped with protrusive ribs 214, 224 extending at the appropriate end section of the outer periphery thereon so as to boost and reinforce the strength of the spout 20 thereby. The external-threaded locking section 222 extending at one end of the second connecting tube 22 of the spout 20 is guided to securely fix to an internal-threaded assembling section 431 of an outlet duct 43 that is mounted to an opening 421 defined by a clearance recess 4211 and disposed at the center of the deck 42 of the outlet mount 40 thereof. Thus, the spout 20 can be firmly held in place to form an arcuate hooked shape to be flexibly housed between the upper and lower housings 31, 32 that are reciprocally combined into an arched configuration. Then, the upper housing 31 has internal-threaded fixing rods 311 matching to thru-holes 322 of the lower housing 32, and screws 45 are respectively applied to pass through thru-holes 422 defining the deck 42 thereon and then the thru-holes 322 of the lower housing 32 in a sequence before securely locked to the fixing rods 311 thereon. The upper housing 31 also has a lift rod hole 312 matching to a clearance thru-hole 323 of the lower housing 32 and the clearance recess 4211 of the deck 42 for the extension of a lift rod 44 there-through. Without being restricted by the form of the fixedly engaged upper and lower housings 31, 32, the spout 20 can form a movable-type assembly to reduce the cost of production and avoid the extra manufacturing process of the aforementioned fixed-type spout that must be integrally molded in individual cast to fit to the upper and lower housings 31, 32. Therefore, the spout 20 can be flexibly matched to a wide range of water supply seats 30, facilitating easy dismantling and assembling as well as reducing the replacement and defective rates thereof to make it more durable in application.

Figure 6:
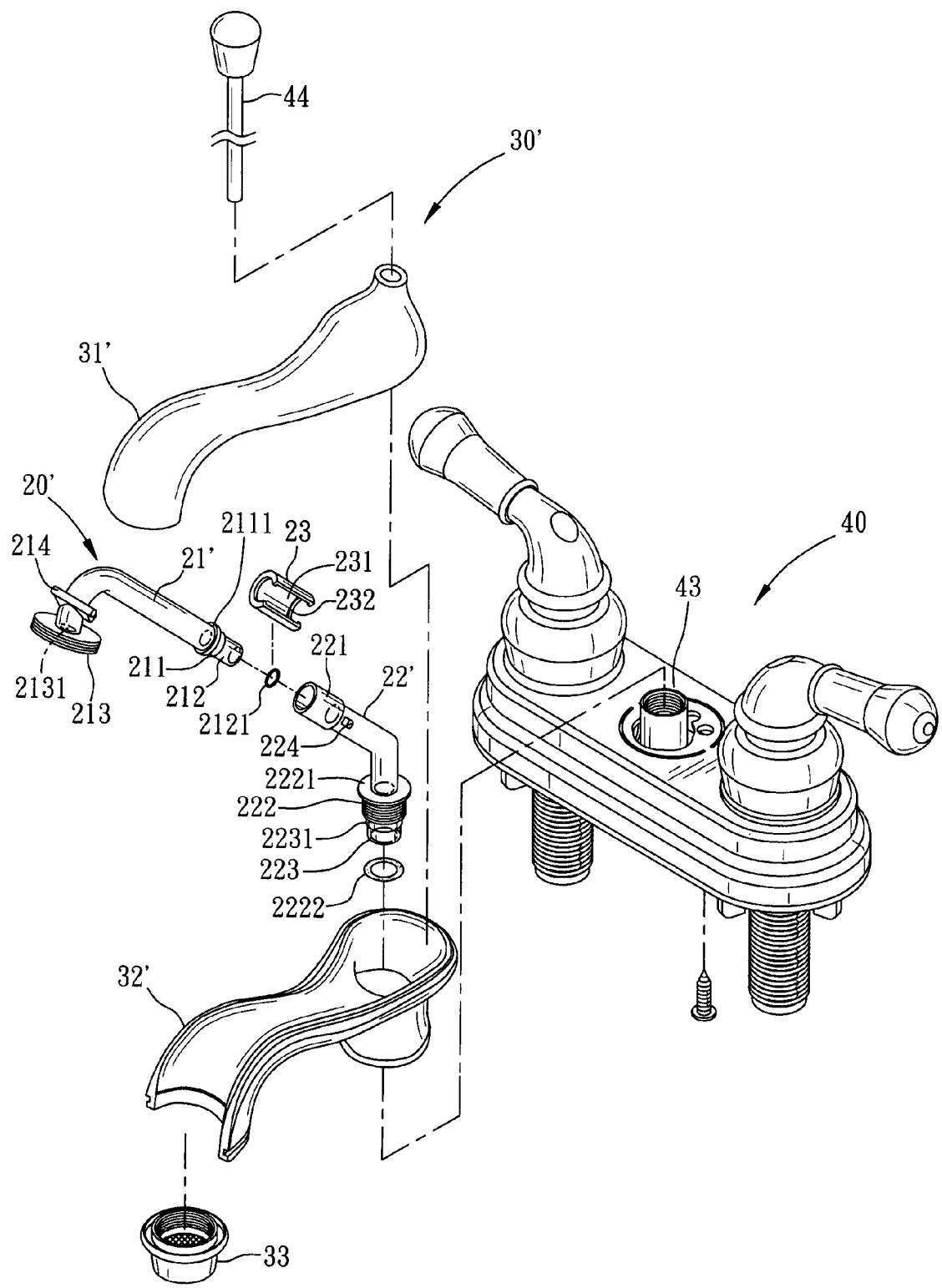
FIG. 6 is an exploded perspective view of another embodiment of the present invention.
Figure 7:
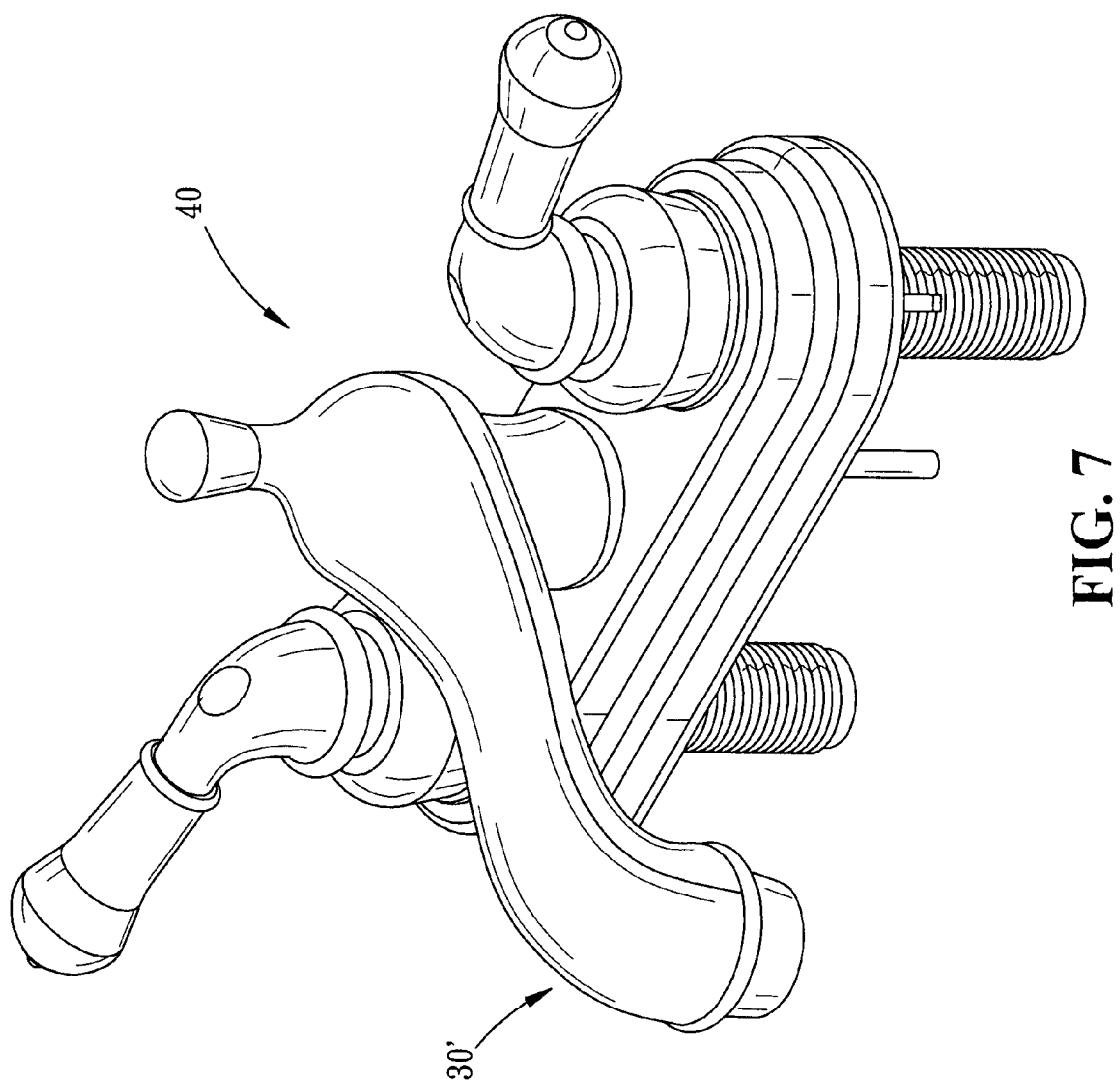
FIG. 7 is an assembled perspective view of another embodiment of the present invention.
Figure 8:
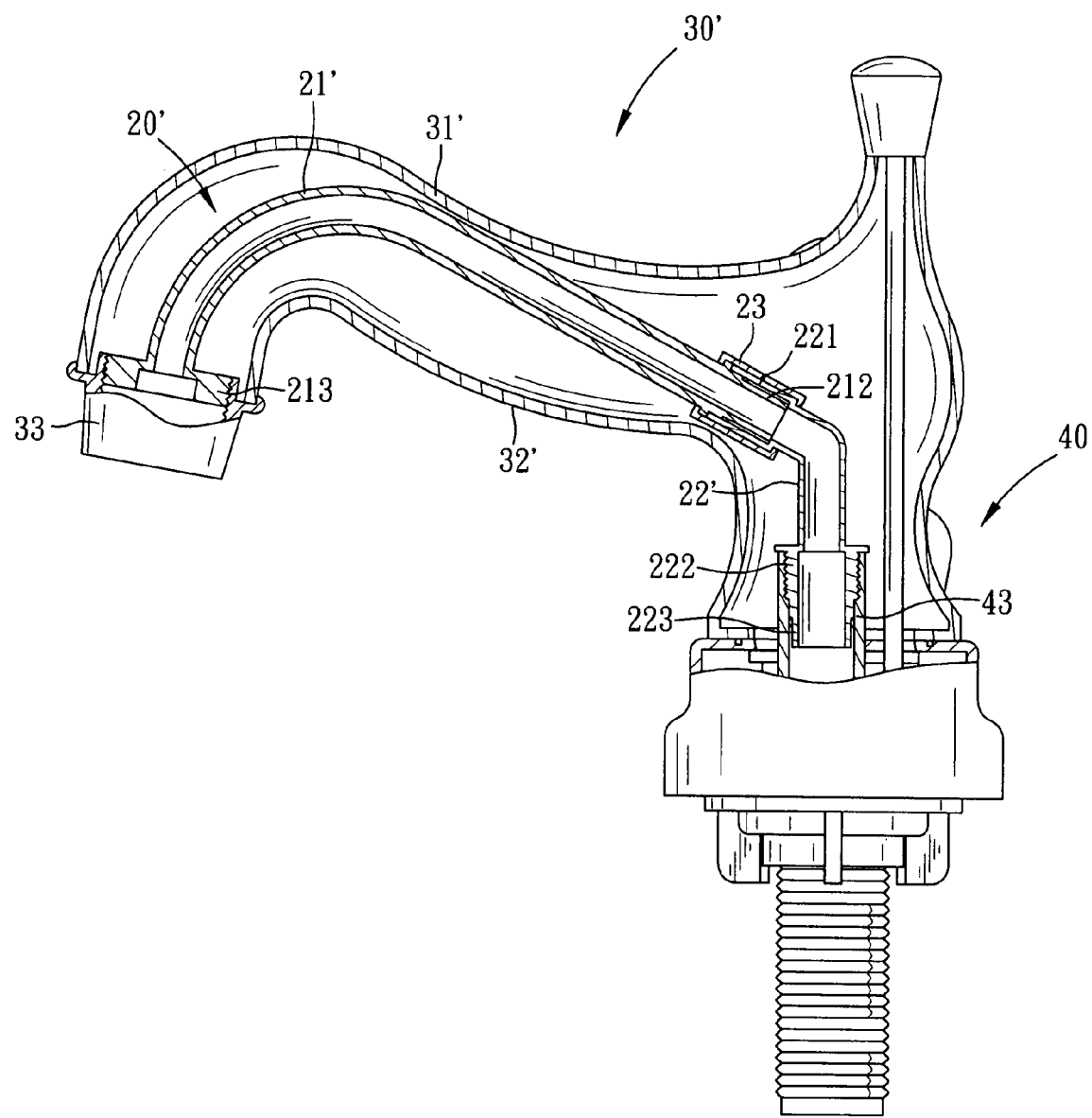
FIG. 8 is an assembled cross sectional view of another embodiment of the present invention.

Please refer to FIG. 6 showing another exploded perspective view of the present invention (accompanied by FIGS. 7, 8). The present invention can also include a spout 20' made up of a set of first and second connecting tubes 21', 22' wherein the first connecting tube 21' is molded into an arcuate hooked shape and the second connecting tube 22' is formed into a transverse V shape. The first and second connecting tubes 21', 22' are conjoined into a crescent-shape spout 20' to be housed between a set of upper and lower housings 31', 32' that are reciprocally combined into a lamp-like water supply seat 30'. Then, the second connecting tube 22' also has the external-threaded locking section 222 secured to the internal-threaded assembly section 431 defining the outlet duct 43 of the outlet mount 40 so as to stably fix in place onto the deck 42 to complete the assembly thereof.

Figure 9:
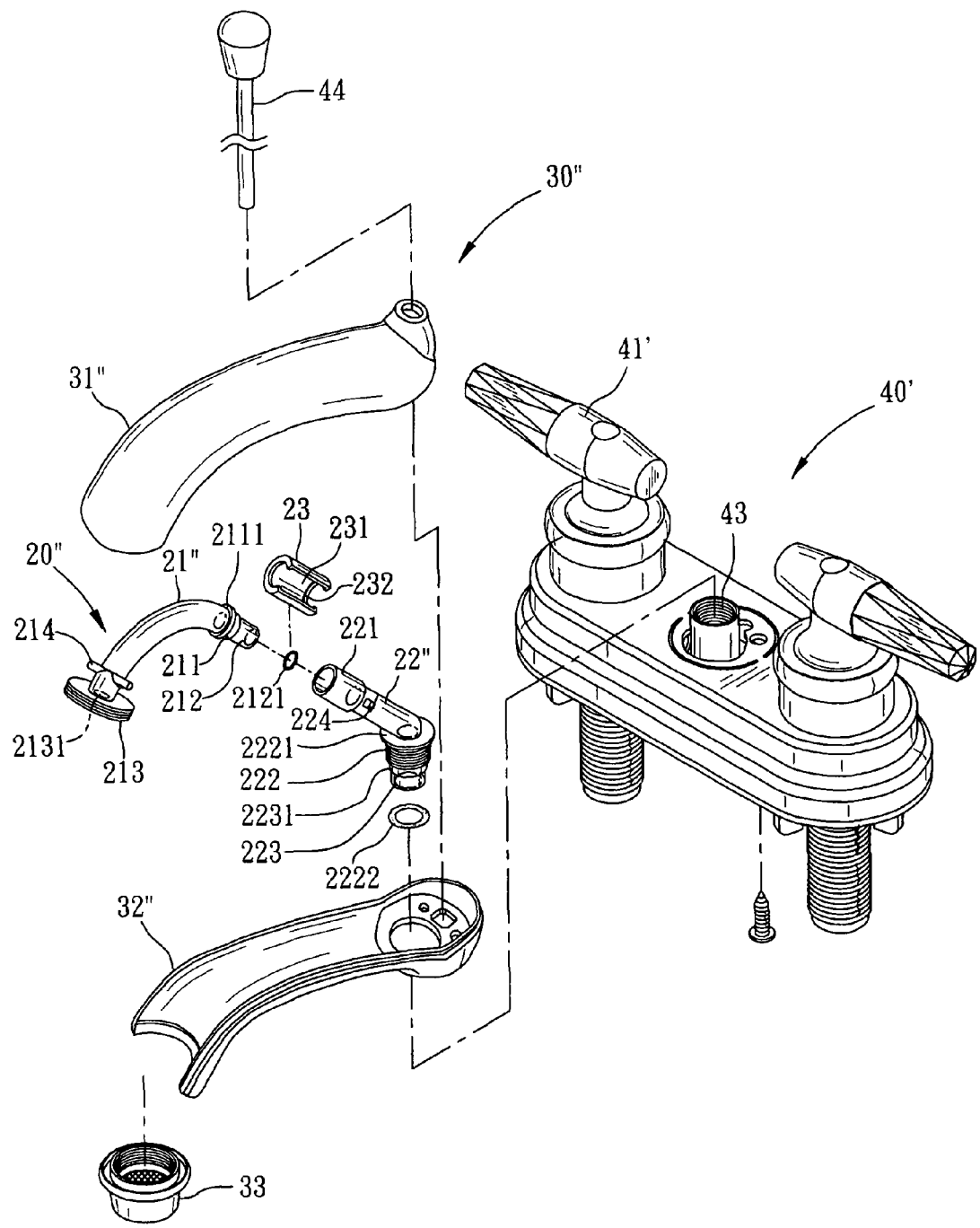
FIG. 9 is an exploded perspective view of a third embodiment of the present invention.
Figure 10:
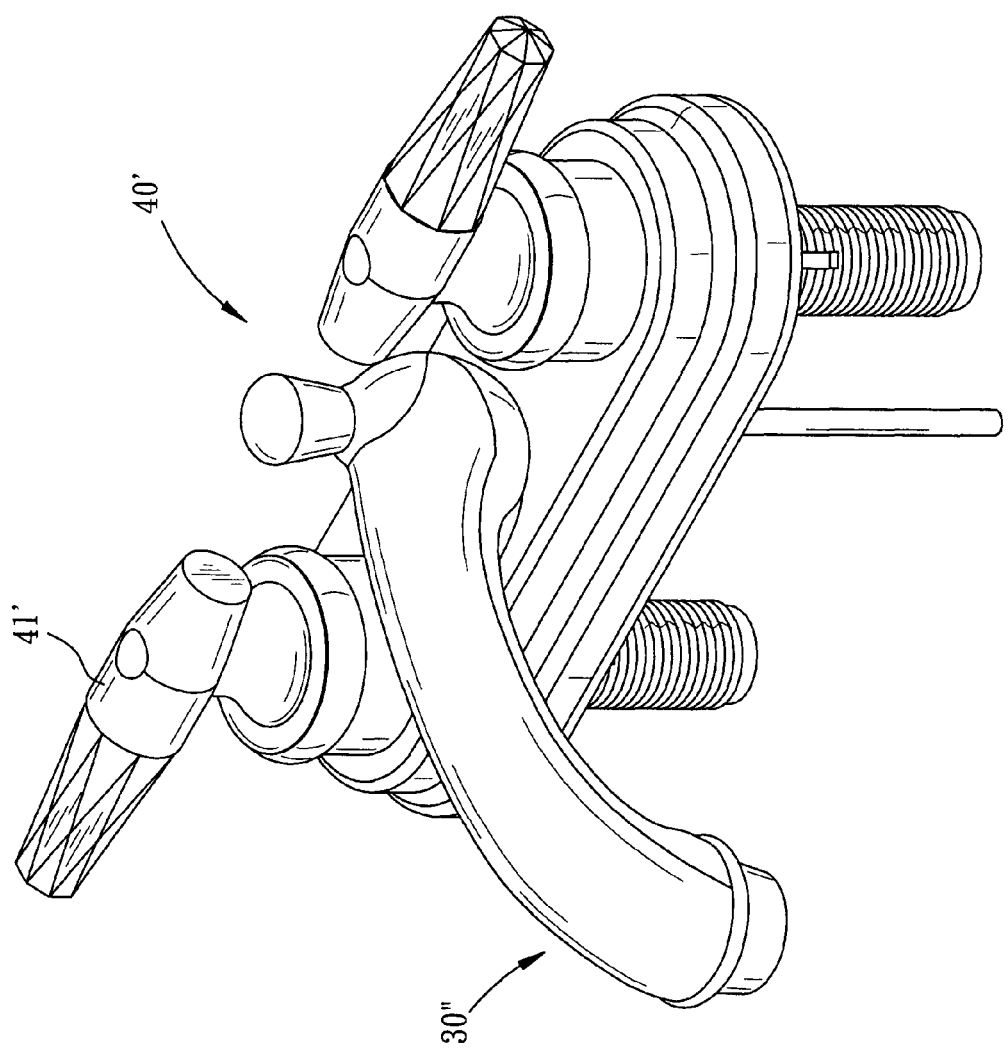
FIG. 10 is an assembled perspective view of a third embodiment of the present invention.
Figure 11:
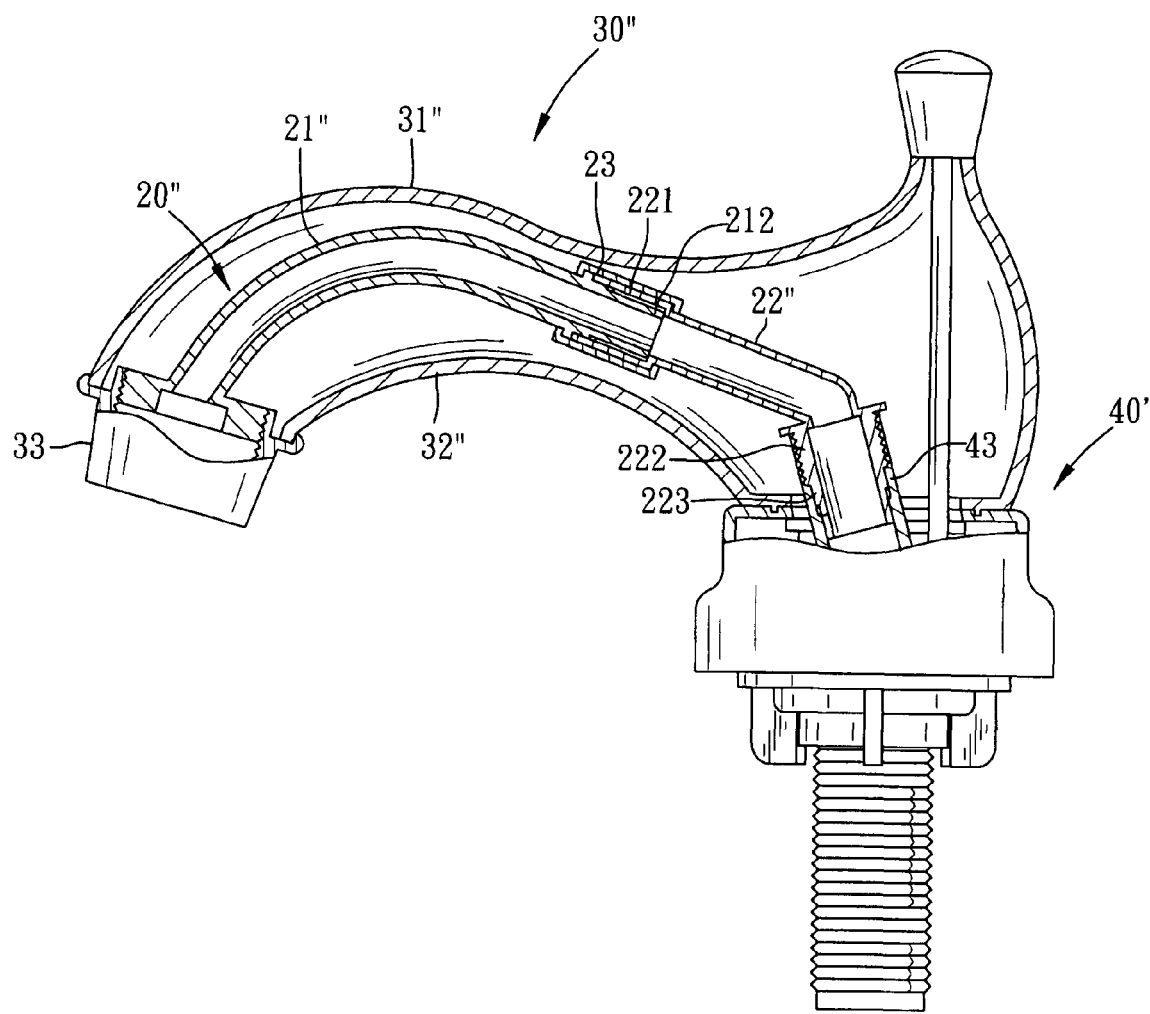
FIG. 11 is an assembled cross sectional view of a third embodiment of the present invention.

Please refer to FIG. 9 showing a third exploded perspective view of the present invention (accompanied by FIGS. 10, 11). The present invention can also include a spout 20" composed of a set of first and second connecting tubes 21", 22" respectively molded into an arched shape and an inverted hook shape. Thus, the first and second connecting tubes 21", 22" can be combined into a slightly curved spout 20" to be housed between a set of upper and lower housings 31", 32" that are reciprocally fixed to each other to form an inverted pipe-like water supply seat 30". Then, the external-threaded locking section 222 of the second connecting tube 22" is secured to the internal-threaded assembly section 431 of the outlet duct 43 extending through the center of the outlet mount 40 having T-shaped handles 41' disposed thereon. Thus, the spout 20" can be stably held in place onto the deck 42 to complete the assembly thereof.

What is claimed is:

1. A faucet spout structure comprising:
    a set of upper and lower housings of a water supple seat;
    a nozzle being secured to a conjoining end area of the set of upper and lower housings;
    an outlet mount, said outlet mount having handles and a deck; and
    a spout including a first connecting tube, a second connecting tube, and a buckling collar, said spout being housed in the set of upper and lower housings and being assembled onto the outlet mount, said buckling collar defining a flexible opening and a set of restricting walls annularly extending at both ends thereon, said first connecting tube and said second connecting tube being mounted and buckled together by said buckling collar,
    wherein the first connecting tube having one end equipped with an abutment surface with a support flange protruding thereon, and a stepwise coupling section extending thereon to which a sealing ring and a coupling cavity disposed at one end of the second connecting tube, said sealing ring and said coupling cavity being sequentially joined and abutted tight thereto,
    wherein the other end of the first connecting tube having a fixing section defining a water outlet,
    wherein the other end of the second connecting tube having an external-threaded locking section with a reinforcing side protruding thereon,
    wherein a stepwise conjoining section having a stop surface extending thereon,
    wherein a water-sealing ring being mounted to the stepwise conjoining section,
    wherein the external-threaded locking section of the second connecting tube being secured to an assembling section of an outlet duct mounted to the outlet mount thereof, and
    whereby the spout being flexibly housed between the set of upper and lower housings without being restricted by the form of the reciprocally engaged set of upper and lower housings thereof.

2. The faucet spout structure as claimed in claim 1, wherein the buckling collar comprises a C-shaped configuration.

3. The faucet spout structure as claimed in claim 1, wherein the first connecting tube and the second connecting tubes of the spout comprise the first connecting tube and the second connecting tube being respectively bent into various curvatures and conjoined into different shapes to be housed between the upper and lower housings reciprocally combined into various-style water supply seats.

4. The faucet spout structure as claimed in claim 1, wherein the first connecting tube of the spout comprises the first connecting tube being molded into one of the following: an arcuate curved shape, an arcuate hooked shape, and an arched shape to reciprocally conjoin to the second connecting tube bent into one of the following: a hooked shape, a transverse V shape, and an inverted hooked shape, forming a spout of an arcuate hooked configuration, a crescent-shaped configuration, or a slightly curved configuration to be housed between the set of upper and lower housings and to be reciprocally fixed to form one of the following: a hooked, a lamp-like, and an inverted pipe-like water supply seat respectively.

5. The faucet spout structure as claimed in claim 1, wherein the first connecting tube and the second connecting tubes comprise the first connecting tube and the second connecting tube being equipped with protrusive ribs extending at an appropriate end section of an outer periphery thereon respectively for boosting and reinforcing the strength of the spout thereby.

6. The faucet spout structure as claimed in claim 1, wherein the spout comprises of high/low-temperature resistant plastic material.

7. The faucet spout structure as claimed in claim 1, wherein the spout matches with the buckling collar.

* * * * *